(12) United States Patent
Blasinski

(10) Patent No.: US 11,608,049 B2
(45) Date of Patent: Mar. 21, 2023

(54) CHARGE MODE ECO

(71) Applicant: AUDI AG, Ingolstadt (DE)

(72) Inventor: Boris Blasinski, Gaimersheim (DE)

(73) Assignee: Audi AG, Ingolstadt (DE)

(*) Notice: Subject to any disclaimer, the term of this patent is extended or adjusted under 35 U.S.C. 154(b) by 0 days.

(21) Appl. No.: 17/410,913

(22) Filed: Aug. 24, 2021

(65) Prior Publication Data

US 2022/0063583 A1    Mar. 3, 2022

(30) Foreign Application Priority Data

Aug. 25, 2020   (DE) .......................... 102020122102.9

(51) Int. Cl.
*B60W 30/182*   (2020.01)
*B60W 20/15*    (2016.01)

(52) U.S. Cl.
CPC .......... *B60W 20/15* (2016.01); *B60W 30/182* (2013.01); *B60W 2510/244* (2013.01); *B60W 2520/10* (2013.01); *B60W 2710/06* (2013.01); *B60W 2710/244* (2013.01)

(58) Field of Classification Search
CPC ...... B60W 10/26; B60W 10/06; B60W 20/13; B60W 2510/244; B60W 2520/10; B60W 2710/06; B60W 2710/08; B60W 2710/244; B60W 50/082; B60W 10/08; B60W 30/182; B60W 20/15; B60L 2240/12; B60L 2240/42; B60L 2240/44
See application file for complete search history.

(56) References Cited

U.S. PATENT DOCUMENTS

| | | | |
|---|---|---|---|
| 5,842,534 A | 12/1998 | Frank | |
| 9,440,644 B2* | 9/2016 | Porras | B60W 20/00 |
| 2010/0145560 A1* | 6/2010 | Komatsu | B60W 10/26 |
| | | | 180/65.265 |
| 2014/0114514 A1* | 4/2014 | Crombez | B60W 20/13 |
| | | | 903/930 |
| 2016/0221569 A1* | 8/2016 | Chen | B60K 6/48 |
| 2018/0056973 A1* | 3/2018 | Belt | B60W 20/13 |

FOREIGN PATENT DOCUMENTS

| | | |
|---|---|---|
| CN | 109910640 A | 6/2019 |
| DE | 699 22 221 T2 | 3/2006 |
| DE | 10 2011 104 443 A1 | 2/2012 |
| DE | 10 2013 112 663 A1 | 5/2015 |
| DE | 10 2015 107 191 A1 | 11/2015 |

* cited by examiner

*Primary Examiner* — Roger L Pang
(74) *Attorney, Agent, or Firm* — Seed Intellectual Property Law Group LLP

(57) ABSTRACT

A method and a device for optimizing fuel consumption includes using a charge mode of a plug-in hybrid vehicle.

10 Claims, 3 Drawing Sheets

Request from the driver for a purely electric drive mode at a driving speed above the predetermined speed threshold value Current state of charge of the traction battery Predetermined state of charge threshold Upon receiving a request from the driver for a purely electric drive mode at a driving speed above the predetermined speed threshold value, checking whether a current state of charge of the traction battery is greater than a predetermined state of charge threshold If the current state of charge of the traction battery is greater than the predetermined state of charge threshold, then activating the purely electric drive mode If the current state of charge of the traction battery is not greater than the predetermined state of charge threshold, then not activating the purely electric drive mode

FIG. 2

CHARGE MODE ECO

BACKGROUND

Technical Field

Embodiments of the present invention relate to a method and a device for optimizing fuel consumption in the charge mode of a plug-in hybrid vehicle.

Description of the Related Art

Today's plug-in hybrid electric vehicles (PHEV for plug-in hybrid electric vehicle) have a charge mode "Battery Charge" that can be selected by the vehicle driver, in which the traction battery is charged with the internal combustion engine at maximum charging speed when driving. The vehicle driver can thus influence the operating strategy themselves, for example by switching to an electric drive mode after the charge mode in order to use the electric energy from the traction battery for electric driving.

By designing the charge mode for maximum charging speed, the fuel consumption of the vehicle is significantly increased, as the energy that reaches the traction battery is generated from additional fuel.

The free operability by the driver enables improper use of the PHEV drive from the point of view of environmental protection if, for example, the battery is charged in the city with the charge mode and later on the highway the energy stored by the charging is used for purely electric driving.

The efficiency of the drive in city traffic is significantly reduced, e.g., by preventing the start-stop function, so that the combustion engine does not switch off at a traffic light stop, and by dispensing with overrun recuperation, whereby combustion engine drag losses are not avoided.

When the battery is almost full, the state of charge (SoC) of the traction battery is increased only very little despite the deterioration in efficiency, as almost full batteries can only be charged very slowly.

DE 10 2015 107 191 A1 teaches a method in which an electric vehicle is operated in an electric mode when a speed of the electric vehicle is at or below a threshold speed, and the electric vehicle is operated in a hybrid mode when the speed of the electric vehicle is above the threshold speed. The threshold speed can be set by the operator.

CN 109910640 A introduces a method that comprises the following steps: measuring a speed of a PHEV in an electric driving state and a SoC of a power battery of the PHEV; determining whether or not the power battery needs to be charged according to the speed value and the SoC; controlling a drive motor of the PHEV to charge the power battery when it is determined that the power battery needs to be charged. The method can charge the power battery when the vehicle is traveling at high speed, so that electric driving of the vehicle can also be achieved using the charged power battery even when the vehicle is in a low-speed overload condition; and fuel consumption is reduced.

From U.S. Pat. No. 5,842,534 A, a method for operating an electric motor and a small auxiliary unit is known, for example an internal combustion engine, in a hybrid electric vehicle as a function of the driving conditions. The operation of the electric motor and the auxiliary unit is coordinated in such a way that the vehicle operates as an emission-free vehicle or electric car at all speeds below a threshold speed, except when the state of charge of the batteries falls below a charging threshold. Furthermore, the vehicle operates at speeds above the threshold speed in a hybrid mode. The batteries are discharged during operation and are not charged by the auxiliary unit, except in an emergency. In this case, the batteries are only charged enough to boost the performance of the small auxiliary unit.

BRIEF SUMMARY

Embodiments provide a method and a device which reduce the fuel consumption required for charging the traction battery and prevent the driver from improperly using the charge mode.

In some embodiments, a charge mode ("Charge Mode ECO") is introduced, which does not allow environmentally harmful use by the driver. Instead of charging the traction battery as quickly as possible in all circumstances, a charging process is only carried out when the vehicle is operated outside the city. It is no longer possible to use the energy charged by the charge mode while driving purely electrically on the highway. In the Eco-charge mode, electric driving is possible with small loads, the combustion engine is decoupled in the thrust mode.

Some embodiments provide a method of controlling a drive system of a plug-in hybrid electric vehicle (PHEV), wherein a) when a charge mode is requested by the vehicle driver, it is checked whether a current speed of the PHEV is greater than a predetermined speed threshold and whether a current charging status of the traction battery of the PHEV is less than a predetermined charging status threshold; and only if both conditions are met, an internal combustion engine of the PHEV is started and the traction battery is charged up to the state of charge threshold and the state of charge of the traction battery is then maintained; and wherein b) when a purely electric drive mode is requested by the vehicle driver at a driving speed above the speed threshold value, it is checked whether a current state of charge of the traction battery is greater than the predetermined state of charge threshold; and only if this is the case, the purely electric drive mode is activated.

BRIEF DESCRIPTION OF THE SEVERAL VIEWS OF THE DRAWINGS

FIG. 2 illustrates features of a method as described herein.

DETAILED DESCRIPTION

Figure 1:
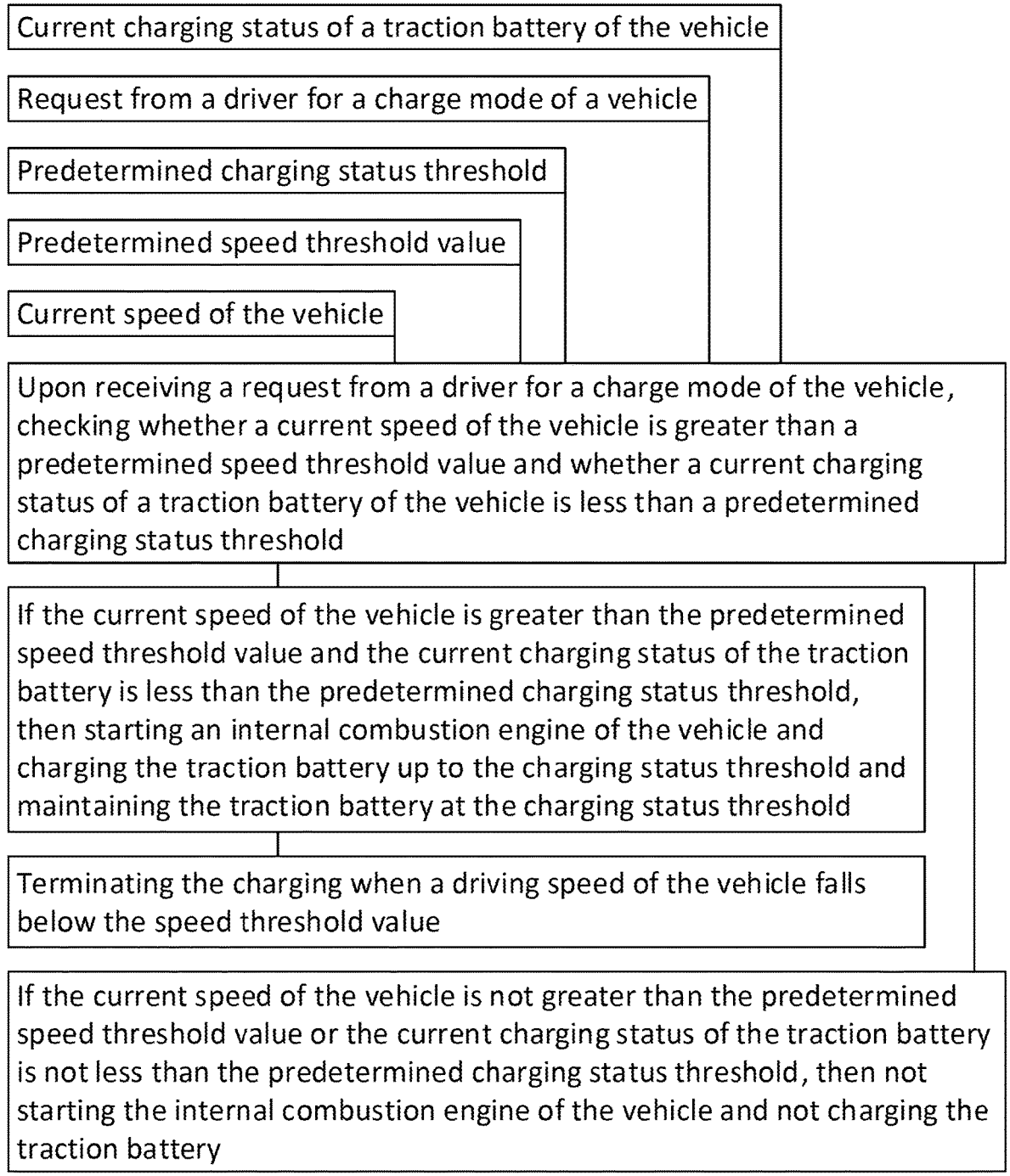
FIG. 1 illustrates features of a method as described herein.
Figure 3:
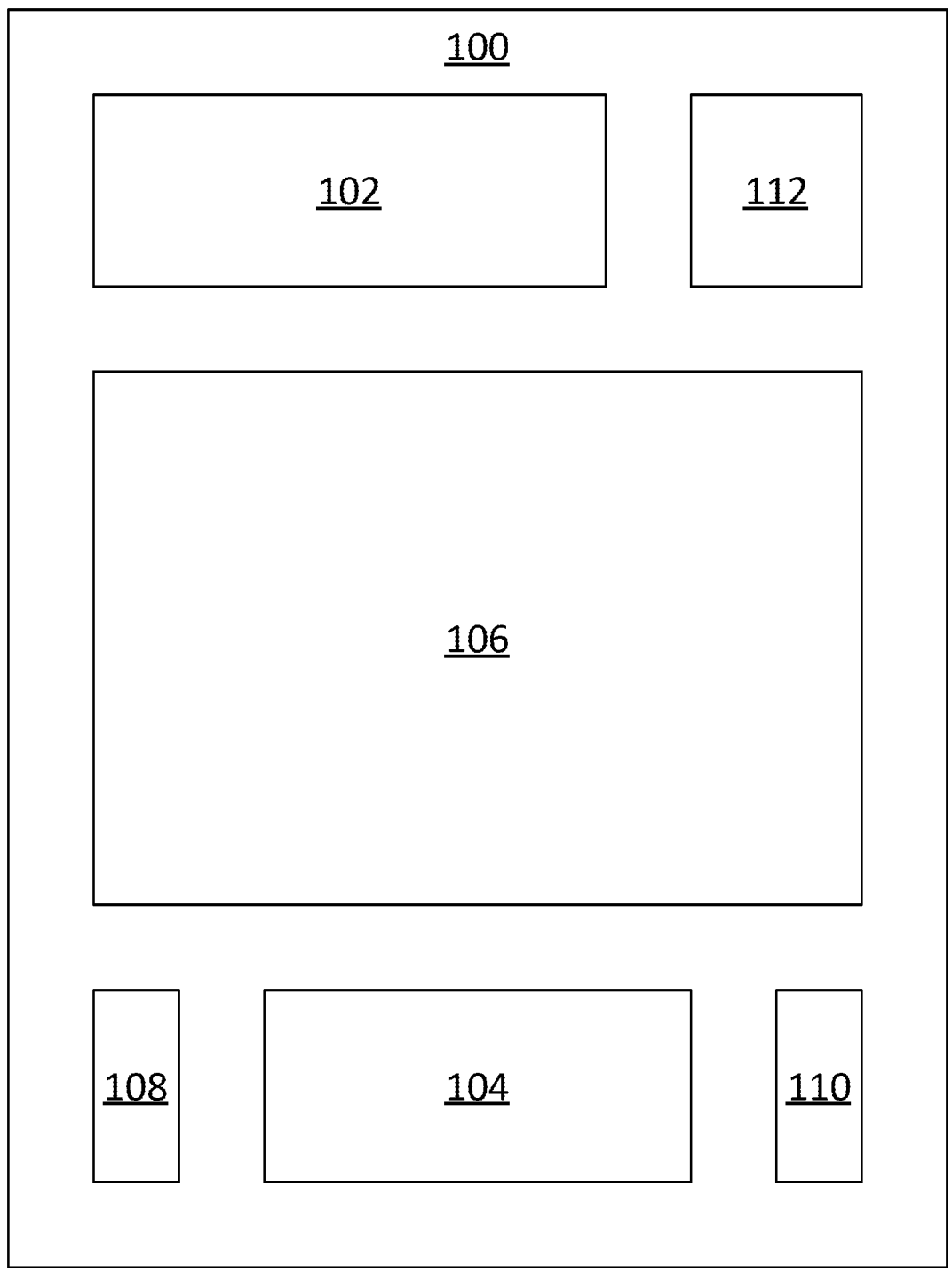
FIG. 3 illustrates features of a vehicle as described herein.

A plug-in hybrid electric vehicle (PHEV) as described herein is a hybrid electric vehicle with at least one electrical machine (EM) and at least one internal combustion engine (ICE), the accumulator (HV battery, traction battery) of which can be charged both via the ICE and the mains.

In one embodiment of the method, the speed threshold value is in the range from 50 km/h to 80 km/h, for example from 50 km/h to 70 km/h, or from 60 km/h to 65 km/h. In a special embodiment, the speed threshold is 60 km/h.

In one embodiment of the method, the state of charge threshold is in the range from 60% to 90% of the maximum charge capacity of the traction battery, for example in the range from 70% to 80%. In a special embodiment, the state of charge threshold is 75% of the maximum charge capacity of the traction battery.

In one embodiment of the method, the charging process is terminated when the vehicle speed of the PHEV falls below the predefined speed threshold. This is the case, for example, when the vehicle enters an emission-sensitive zone again. In one embodiment, the charging process is only terminated when the vehicle speed of the PHEV falls below the specified speed threshold for a longer period of time, e.g., more than 1 minute, or more than 5 minutes. This prevents the charging process from being aborted when braking too hard.

The charge mode described herein (Charge Mode ECO) is not active until the traction battery is fully charged, but only maintains the charge status after reaching the predetermined charge state threshold (e.g., 75% HV battery charge). The EV mode can only be activated for states of charge above the predetermined state of charge threshold (e.g., at >75%), i.e., a state of charge that is reached after external charging.

In a charge mode of the prior art, the internal combustion engine is always active and charging also takes place when the vehicle is stationary; thrust cutoff takes place in coasting phases. In the charge mode described herein, a charging process only takes place out of town at speeds above the threshold and braking energy occurring during the charging process is recuperated.

One of the advantages of the method described herein is that fewer emissions are generated in emission-sensitive areas (cities), as charging is only possible at speeds that cannot be reached in urban areas. By raising the release threshold of the EV mode to, for example >75% state of charge, it is no longer possible to use the energy stored during the charging process by driving purely electrically at high speeds. By ensuring the best possible efficiency of the drive and clever use of the charge mode, fuel is saved. The life of the traction battery is also increased as very high charge levels are avoided.

Some embodiments also provide a device for controlling a drive system of a plug-in hybrid electric vehicle (PHEV) 100. The drive system comprises at least one internal combustion engine (ICE) 102, at least one electrical machine (EM) 104, at least one traction battery 106, means for measuring a driving speed of the PHEV 108 and means for measuring a state of charge of the traction battery 110, and a control device 112. The control device is set up, when a charge mode is requested by the vehicle driver, to check whether a current drive speed of the PHEV is greater than a predetermined speed threshold, and whether a current charging status of the traction battery of the PHEV is less than a predetermined charging status threshold; and only if both conditions are met, to start the at least one ICE, to switch the at least one EM to a generator operation and to let the traction battery to be charged up to the state of charge threshold and to maintain the state of charge of the traction battery subsequently. The control device is also set up, when a purely electric drive mode is requested by the vehicle driver at a driving speed above the speed threshold, to check whether a current state of charge of the traction battery is greater than the predetermined state of charge threshold; and only if this is the case, to activate the purely electric drive mode.

In one embodiment, the control unit set up to end the charging process when the vehicle speed of the PHEV falls below the predetermined speed threshold.

It is understood that the features mentioned above and those yet to be explained below can be used not only in the respectively specified combination, but also in other combinations or on their own, without departing from the scope of the present invention.

German patent application no. 10 2020 122 102.9, filed Aug. 25, 2020, to which this application claims priority, is hereby incorporated herein by reference, in its entirety.

Aspects and features of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method of controlling a drive system of a plug-in hybrid electric vehicle, comprising:
   upon receiving a request from a driver for a charge mode of the vehicle, checking whether a current speed of the vehicle is greater than a predetermined speed threshold value and whether a current charging status of a traction battery of the vehicle is less than a predetermined charging status threshold;
   if the current speed of the vehicle is greater than the predetermined speed threshold value and the current charging status of the traction battery is less than the predetermined charging status threshold, then starting an internal combustion engine of the vehicle and charging the traction battery up to the charging status threshold and maintaining the traction battery at the charging status threshold;
   if the current speed of the vehicle is not greater than the predetermined speed threshold value or the current charging status of the traction battery is not less than the predetermined charging status threshold, then not starting the internal combustion engine of the vehicle and not charging the traction battery;
   upon receiving a request from the driver for a purely electric drive mode at a driving speed above the predetermined speed threshold value, checking whether a current state of charge of the traction battery is greater than a predetermined state of charge threshold;
   if the current state of charge of the traction battery is greater than the predetermined state of charge threshold, then activating the purely electric drive mode; and
   if the current state of charge of the traction battery is not greater than the predetermined state of charge threshold, then not activating the purely electric drive mode.

2. The method according to claim 1, wherein the predetermined speed threshold is in the range of 50 km/h to 80 km/h.

3. The method according to claim 2, wherein the predetermined speed threshold is 60 km/h.

4. The method according to claim 1, wherein the predetermined state of charge threshold is in the range of 60% to 90% of a maximum charge capacity of the traction battery.

5. The method according to claim 4, wherein the predetermined state of charge threshold is 75% of the maximum charge capacity of the traction battery.

6. The method according to claim 1, further comprising terminating the charging when a driving speed of the vehicle falls below the speed threshold value.

7. A device for controlling a drive system of a plug-in hybrid electric vehicle, comprising:
   at least one internal combustion engine;
   at least one electrical machine;
   at least one traction battery;
   a first measuring device configured to measure a driving speed of the vehicle;
   a second measuring device configured to measure a state of charge of the traction battery; and
   a control device configured to:

upon receiving a request from a driver for a charge mode of the vehicle, checking whether a current speed of the vehicle is greater than a predetermined speed threshold and whether a current charging status of the traction battery is less than a predetermined charging status threshold;

if the current speed of the vehicle is greater than the predetermined speed threshold and the current charging status of the traction battery is less than the predetermined charging status threshold, then starting the internal combustion engine, and switching the at least one electrical machine to a generator operation and letting the traction battery charge up to the predetermined charging status threshold and then maintaining the charging status of the traction battery;

if the current speed of the vehicle is not greater than the predetermined speed threshold or the current charging status of the traction battery is not less than the predetermined charging status threshold, then not starting the internal combustion engine and not switching the at least one electrical machine to the generator operation;

upon receiving a request from the driver for a purely electric drive mode at a driving speed above the predetermined speed threshold, checking whether a current state of charge of the traction battery is greater than a predetermined state of charge threshold;

if the current state of charge of the traction battery is greater than the predetermined state of charge threshold, then activating the purely electric drive mode; and if the current state of charge of the traction battery is not greater than the predetermined state of charge threshold, then not activating the purely electric drive mode.

8. The device according to claim 7, wherein the predetermined speed threshold value is in the range of 50 km/h to 80 km/h.

9. The device according to claim 7, wherein the predetermined state of charge threshold is in the range of 60% to 90% of the maximum charge capacity of the traction battery.

10. The device according to claim 7, wherein the control device is configured to end the charging when the current speed of the vehicle falls below the predetermined speed threshold value.

* * * * *